Nov. 11, 1952　　　　　F. B. CARNEY　　　　　2,617,344
MOUNTING FOR DISK PLOWS
Filed Sept. 18, 1948　　　　　　　　　　　　2 SHEETS—SHEET 1
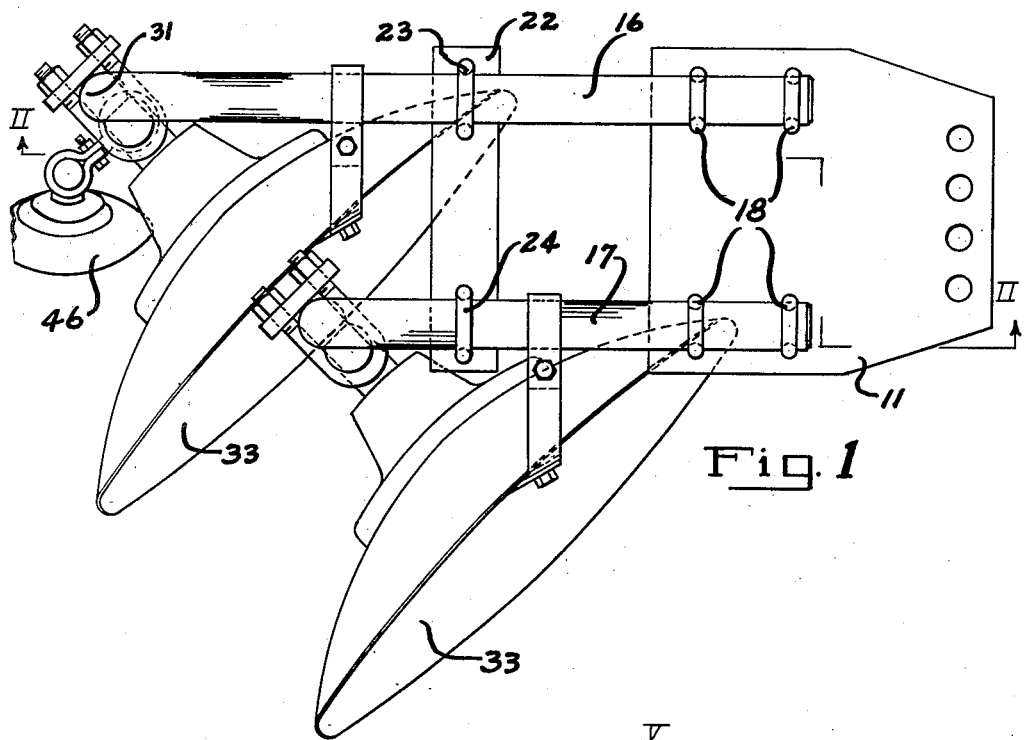
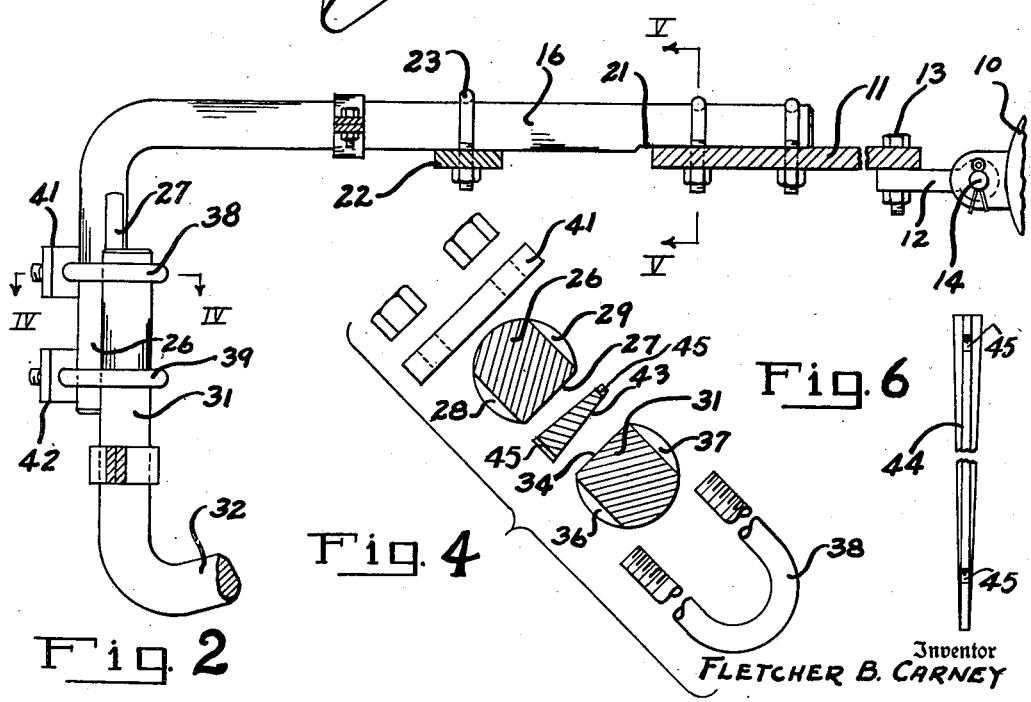
Inventor
FLETCHER B. CARNEY
By
Jennings & Carter
Attorneys Nov. 11, 1952     F. B. CARNEY     2,617,344
MOUNTING FOR DISK PLOWS
Filed Sept. 18, 1948     2 SHEETS—SHEET 2
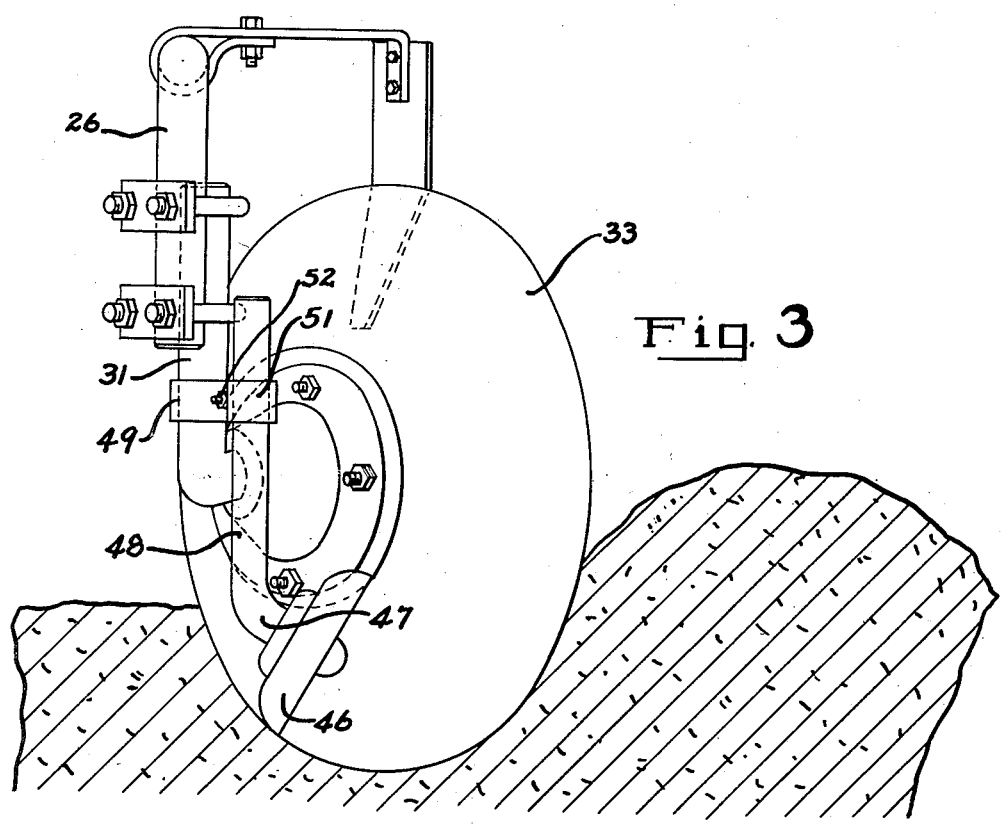
Fig. 3
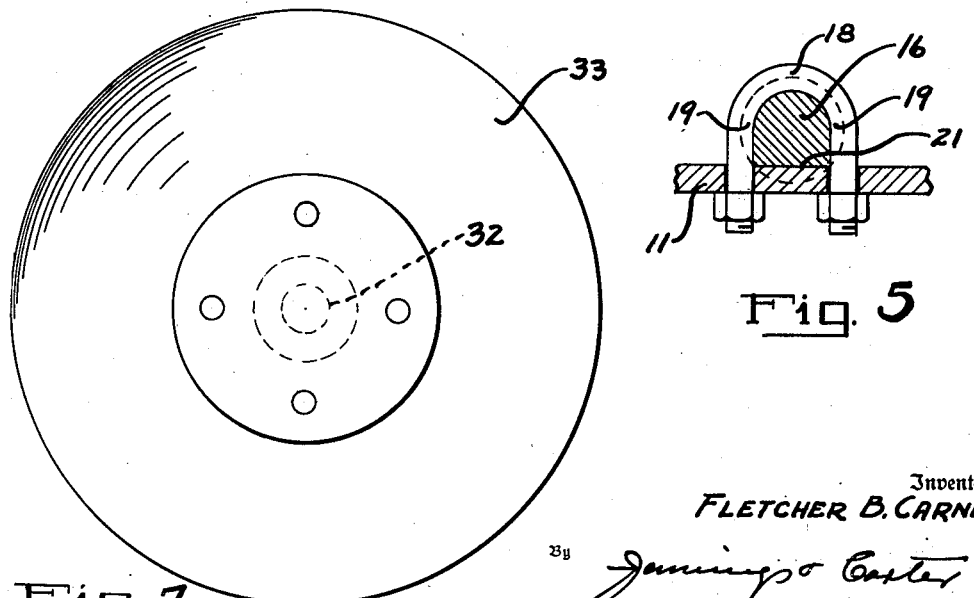
Fig. 5
Fig. 7
Inventor
FLETCHER B. CARNEY
By
Attorneys

Patented Nov. 11, 1952

2,617,344

UNITED STATES PATENT OFFICE 2,617,344

MOUNTING FOR DISK PLOWS

Fletcher B. Carney, Birmingham, Ala.

Application September 18, 1948, Serial No. 49,897

13 Claims. (Cl. 97—53)

1

This invention relates to a mounting for disk plows and particularly for tractor drawn disk plows and has for an object the provision of a simple, easily manufactured mounting of the character described which shall combine the maximum of rigidity with a minimum of weight.

A further object of my invention is to provide a mounting for a tractor drawn disk plow which shall include freedom of vertical pivotal movement, with restraint of horizontal pivotal movement, and which shall include novel adjusting means for varying the angle of the plow with respect to the furrow.

A still further object of my invention is to provide a mounting for a tractor drawn disk plow which shall include a furrow wheel with novel means for securing its mounting to the main plow beam.

Briefly, my invention contemplates a mounting for tractor drawn disk plows which includes a hitch plate pivotally mounted for vertical movement on the tractor but restrained against horizontal pivotal movement. One or more plow beams are rigidly secured to the hitch plate, each of which includes a horizontal portion and a downturned portion, the downturned portion having at least one lateral flat surface. Secured to the downturned portion of the beam is a disk spindle which includes an upstanding portion with a relatively flat side cooperating with the flat side of the plow beam and with an upwardly and forwardly inclined portion upon which is mounted the disk plow. The upstanding portion is secured to the downturned portion of the beam by means of U-bolts which draw the cooperating flat sides tightly together. The angularity of the disk plow spindle with respect to the beam may be varied by means of wedge members interposed between the relatively flat surfaces of the beam and the disk spindle, respectively. Secured to the upstanding portion of the disk spindle is a furrow wheel and its spindle, the same being secured to the upstanding portion of the disk spindle by a double clamp which positions the furrow wheel to trail the disk and engage the side of the furrow.

A disk plow embodying the features of my invention is illustrated in the accompanying drawings, forming a part of this application, in which:

Fig. 1 is a plan view showing two disk plows mounted in accordance with my invention;

Fig. 2 is a sectional view taken along the line II—II of Fig. 1 and showing one method of attachment to a tractor;

Fig. 3 is a rear view showing a single disk plow mounted in accordance with my invention;

2

Fig. 4 is an exploded sectional view taken along the line IV—IV of Fig. 2;

Fig. 5 is a sectional view taken along the line V—V of Fig. 2;

Fig. 6 is a detail view showing an alternate form of wedge member; and,

Fig. 7 is a side view of one of the disk plows.

Referring now to the drawings for a better understanding of my invention, I show in Fig. 2 a fragment 10 of a tractor and at 11 a hitch plate for securing plows thereto. The hitch plate 11 is secured to a hinge member 12 by means of bolts 13, the hinge member being pivotally connected to the tractor by means of a horizontal pivot pin 14, which permits vertical, pivotal movement of the hitch plate, but restrains horizontal movement.

At 16 and 17, I show plow beams which are secured to the hitch plate 11 by means of U-bolts 18. As shown in the drawings the beams 16 and 17 are generally round in cross section, though it will be apparent that any desired cross section may be employed. In order to secure the beams against endwise movement on the hinge plate 11, I provide slots, or notches 19 in the sides of the beams with which the U-bolts engage, as shown in Fig. 5 of the drawing. Also it will be seen that I provide the underside of each of the beams with a relatively flat surface 21 which engages with the hinge plate and prevents relative angular movement between the beam and the hitch plate. In order to provide still greater rigidity and to hold the beams 16 and 17 in spaced relation, I provide a cross plate 22 which is secured to the beams 16 and 17 by means of U-bolts 23 and 24.

Each of the beams 16 and 17 is provided with a downturned portion 26 which is provided with at least one relatively flat side 27 and is provided with lateral notches 28 and 29.

Associated with each of the plow beams 16 and 17 is a disk spindle embodying an upstanding portion 31 and an upwardly and forwardly inclined, generally horizontal spindle 32 upon which is mounted a disk plow 33. Each of the upstanding portions 31 includes a relatively flat surface 34 adapted to cooperate with the relatively flat surface 27 of the beam and with lateral notches 36 and 37 which lie opposed to the lateral notches 28 and 29. U-bolts 38 and 39 embrace the downturned portions 26 of the beams and the upstanding portions 31 of the disk spindles and pass through tie plates 41 and 42 to secure the disk spindles to the beams.

It will be noticed from a consideration of Figs. 1 and 2 that the spindle 32 upon which the disk plow 33 is mounted is forwardly inclined with respect to the beam upon which it is mounted and is slightly upwardly inclined to afford the proper angular relation of the disk plow to the furrow. This inclination may be varied by means of wedge members 43 which are interposed between the flat surfaces 27 and 34 on the beam and disk spindle respectively. These wedge members 43 may be inclined in one direction only as shown in Fig. 4 of the drawing, or may be inclined both vertically and laterally as shown by the wedge member 44 in Fig. 6 of the drawing.

The wedge members may be made narrow enough to be embraced by the U bolts that clamp the spindles to the beams, but are preferably notched as at 45 to receive the U bolts so that the wedge members are prevented from shifting vertically along the spindle.

In order to withstand the lateral thrust of the disk plows, I provide a furrow wheel 46 which is mounted on a downwardly inclined spindle 47 to the rear of the inner disk 33, as shown in Figs. 1 and 3 of the drawing. The disk spindle 47 is provided with an upstanding portion 48 which is secured to the upstanding portion 31 of the associated disk spindle and to the rear thereof, by means of a double clamping member having clamping portions 49 and 51 which embrace the disk spindle and the furrow wheel spindle respectively and are held in secured position by means of a bolt 52. By the means shown, the furrow wheel 46 may be adjusted to the required position to counterbalance the lateral thrust of the disks.

From the foregoing it will be apparent that I have devised an improved disk plow mounting which is simple and sturdy of construction and which provides the maximum of adjustment with a maximum of rigidity in operation and a minimum of weight.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a tractor drawn disk turning plow mounting, a hitch plate mounted on the tractor for vertical pivotal movement, a plow beam secured to the hitch plate and extending rearwardly therefrom, a downturned portion on the plow beam having a relatively flat surface along one side, a disk spindle having an upturned portion with a relatively flat surface engaging the flat surface of the plow beam, U-bolts embracing the downturned portion of the beam and the upturned portion of the spindle to secure them together; an upwardly inclined portion of said disk spindle having a disk mounted thereon, and a furrow wheel spindle having an upturned portion secured to the rear of the upturned portion of the disk spindle and a downwardly inclined portion with a furrow wheel thereon and projecting oppositely to the upwardly inclined portion of the disk spindle.

2. In a disk turning plow mounting, a plow beam having a rearward downturned portion, a disk spindle having a disk mounted thereon and having an upturned portion extending alongside and adjacent to the the downturned portion of the beam, there being adjacent flat surfaces on the downturned portion of the beam and the upturned portion of the spindle, U-bolts securing the downturned portion of the beam to the upturned portion of the spindle, said portions of the beam and spindle being adapted for receiving a wedge means therebetween and in face engagement with the said flat surfaces to determine the relative angular relation between the spindle and the beam, said downturned and upturned portions being notched to receive the legs of said U-bolts whereby said U-bolts key the beam and spindle together in predetermined and fixed vertical relation, said flat adjacent surfaces being substantially normal to the axis of the disk spindle whereby the working thrusts on said disk spindle are substantially normal to the said surfaces.

3. In a tractor drawn disk turning plow mounting, a hitch plate adapted for being mounted on a tractor for vertical pivotal movement, a plow beam secured to the hitch plate and extending rearwardly therefrom, a downturned portion on the plow beam having a relatively flat surface along one side, a disk spindle having an upturned portion with a relatively flat surface adjacent the flat surface of the plow beam, said surfaces being substantially normal to the axis of said disk spindle, U-bolts embracing the downturned portion of the beam and the upturned portion of the spindle to secure them together, said disk spindle having an upwardly inclined portion and a plowing disk rotatably mounted thereon, there being lateral notches formed in the downturned portion of the beam and in the upturned portion of the disk spindle through which the U-bolts pass whereby the beam and spindle are keyed together in fixed vertical relation, and a furrow wheel spindle rigid with said disk spindle and a furrow wheel thereon, said furrow wheel being positioned directly behind said disk and being at an angle to the vertical so as to engage the side of the furrow turned by said disk and thus absorb the side thrust on the plow.

4. In a disk plow; a hitch plate adapted for attachment to a tractor or the like for pivotal movement in a vertical plane, a plurality of plow beams rigidly secured to said plate and extending rearwardly therefrom, each beam having spindle means at its rear end for mounting a plowing disk, one of said beams having rigidly mounted thereon immediately adjacent its said spindle means a furrow wheel spindle adapted for mounting a furrow wheel to run in the furrow of the disk associated with said beam immediately behind the said disk and bearing against the side of the furrow toward which the disk is thrust by its plowing action, and a brace member extending between said beams rearwardly of said hitch plate so the transverse thrust exerted on both beams by the plowing disks they carry will be transmitted to said furrow wheel.

5. In a disk plow; a beam forming a support for a plowing disk spindle, a plowing disk spindle, said beam and spindle having complementary flat surfaces thereon, means for clamping said beam and spindle together in overlapping relation with the complementary surfaces adjacent, and means for varying the angular position of said spindle relative to said beam, comprising invertible and reversible wedge means adapted for being clamped between said beam and spindle in a plurality of positions, said wedge means having flat faces to engage said surfaces and being of a length substantially equal to the overlap of the beam and spindle whereby a solid mass of metal exists in any plane through the overlapping parts of said beam and spindle.

6. In a disk plow; a plowing beam having means at one end for connection with a tractor or the like and having a flat surface on one side at its other end, a disk spindle having a portion extending therefrom also with a flat surface and said portion being adapted to lie along the rear end of said beam with the said flats in face engagement, means for clamping said extending portion and the rear end of said beam together, a flat sided reversible and invertible wedge means adapted for being placed between said flats with its sides in face engagement with both thereof to provide for a solid mass of metal between said flats, and means for clamping said wedge means, beam, and the extending portion of said spindle rigidly together in a variety of adjusted positions, depending on the position of said wedge means with respect to said flats, said flats being so arranged that the direction of the working thrust on said spindle intersects the plane of the flats at a relatively large angle.

7. In a disk plow: a hitch plate having pivot means at its front edge for connection with a tractor or the like for pivotal movement in a vertical plane, a pair of spaced plow beams secured to said hitch plate and extending rearwardly therefrom and each having its rear portion bent vertically downwardly, said rear portions lying in a plane diagonal to the direction in which said beams extend, a plow disk spindle for each beam comprising an outwardly extending spindle portion and a vertically extending part adapted for lying along the turned down parts of said beams, wedge means receivable between the upturned parts of said disk spindles and the turned-down parts of said beams, and means for clamping said parts and wedges together so that a solid mass of metal exists in a horizontal plane through said parts and wedge and at all positions along said wedge.

8. In a disk plow; a hitch plate having pivot means at its front edge for connection with a tractor or the like for pivotal movement in a vertical plane, a pair of spaced plow beams secured to said hitch plate and extending rearwardly therefrom and each having its rear portion bent vertically downwardly, said rear portions lying in a plane diagonal to the direction in which said beams extend, a plow disk spindle for each beam comprising an outwardly extending spindle portion and a vertically extending part adapted for lying along the turned down parts of said beams, wedge means receivable between the upturned parts of said disk spindles and the turned-down parts of said beams, means for clamping said parts and wedges together so that a solid mass of metal exists in a horizontal plane through said parts and wedge and at all positions along said wedge, and a furrow wheel supported on one of said disk spindles and adapted for bearing on the side of the furrow turned by the associated disk for resisting side thrusts on said plow and for regulating the depth thereof.

9. In a disk plow; a hitch plate having pivot means at its front edge for connection with a tractor or the like for pivotal movement in a vertical plane, a pair of spaced plow beams secured to said hitch plate and extending rearwardly therefrom and each having its rear portion bent vertically downwardly, said rear portions lying in a plane diagonal to the direction in which said beams extend, a plow disk spindle for each beam comprising an outwardly extending spindle portion and a vertically extending part adapted for lying along the turned down parts of said beams, wedge means receivable between the upturned parts of said disk spindles and the turned-down parts of said beams, means for clamping said parts and wedges together so that a solid mass of metal exists in a horizontal plane through said parts and wedge and at all positions along said wedge, and a furrow wheel supported on one of said disk spindles and adapted for bearing on the side of the furrow turned by the associated disk for resisting side thrusts on said plow and for regulating the depth thereof, and brace means extending between said beams so the side thrust on both plowing disks is transmitted to said furrow wheel.

10. In a disc plow; a beam having a portion extending substantially horizontally, and adapted for connection at its forward end with a draft means, a vertically downwardly extending portion at the rear end of said beam, a spindle for receiving a plowing disc extending somewhat forwardly and upwardly from the lower end of the said vertical portion of said beam, a plowing disc on said spindle, a furrow wheel spindle rigidly mounted on the said vertical portion of said beam adjacent the lower end thereof, and a furrow wheel mounted on said furrow wheel spindle, the axis of said furrow wheel being in a plane substantially normal to the direction of travel of the plow, and said wheel being offset laterally from the center of said plowing disc, so that the wheel runs wholly within and on the side of the furrow turned by the plowing disc, said furrow wheel being at least partly within the longitudinal limits of said disc, so as to be closely adjacent said disc and thus to be substantially closer to the line of action of the resultant of the plowing forces on the disc than the said resultant is to the said forward end of the beam whereby said furrow wheel absorbs most of the lateral thrust on the plowing disc.

11. An arrangement as set forth in claim 10, in which the spindle for the furrow wheel is inclined so that the wheel runs on the side of the furrow toward which the disc is thrust by its plowing action.

12. An arrangement as set forth in claim 11 in which the said angle of inclination of the furrow wheel spindle is such that the thrust on the said furrow wheel is substantially radial thereof.

13. An arrangement as set forth in claim 10 in which the said vertical portion of the beam is in the form of two clamped-together overlapping parts for adjustment of the plowing disc spindle relative to the said beam, the said furrow wheel spindle being secured to the lower one of said parts.

FLETCHER B. CARNEY.

REFERENCES CITED

The following references are of record in the file of this patent:

UNITED STATES PATENTS

| Number | Name | Date |
| --- | --- | --- |
| 819,532 | Fowler | May 1, 1906 |
| 1,100,589 | Long | June 16, 1914 |
| 2,324,870 | Orelind | July 20, 1943 |
| 2,454,482 | Rutter | Nov. 23, 1948 |
| 2,456,465 | Strandlund | Dec. 14, 1948 |

FOREIGN PATENTS

| Number | Country | Date |
| --- | --- | --- |
| 8,982/32 | Australia | of 1932 |